US008739043B2

(12) United States Patent
Sauve et al.

(10) Patent No.: US 8,739,043 B2
(45) Date of Patent: May 27, 2014

(54) SIGNING UP TO A PERSON OR ENTITY

(75) Inventors: Aaron J. Sauve, Redmond, WA (US); Daniel M. Saimo, Snoqualmie, WA (US)

(73) Assignee: Microsoft Corporation, Redmond, WA (US)

( * ) Notice: Subject to any disclaimer, the term of this patent is extended or adjusted under 35 U.S.C. 154(b) by 1279 days.

(21) Appl. No.: 11/801,621

(22) Filed: May 10, 2007

(65) Prior Publication Data

US 2008/0282174 A1 Nov. 13, 2008

(51) Int. Cl.

| | |
|---|---|
| G06F 15/16 | (2006.01) |
| G06F 17/00 | (2006.01) |
| G06F 17/20 | (2006.01) |
| G06F 17/21 | (2006.01) |
| G06F 17/22 | (2006.01) |
| G06F 17/24 | (2006.01) |
| G06F 17/25 | (2006.01) |
| G06F 17/26 | (2006.01) |
| G06F 17/27 | (2006.01) |
| G06F 17/28 | (2006.01) |
| G06F 3/00 | (2006.01) |

(52) U.S. Cl.
USPC ............ 715/748; 709/217; 715/207; 715/760

(58) Field of Classification Search
USPC .................................. 715/748, 805; 709/217
See application file for complete search history.

(56) References Cited

U.S. PATENT DOCUMENTS

| | | | |
|---|---|---|---|
| 5,848,396 A | 12/1998 | Gerace | |
| 5,974,441 A * | 10/1999 | Rogers et al. ................. | 709/200 |
| 6,029,182 A * | 2/2000 | Nehab et al. .................. | 715/205 |
| 6,199,077 B1 * | 3/2001 | Inala et al. ..................... | 715/201 |
| 7,035,926 B1 | 4/2006 | Cohen et al. | |
| 7,149,704 B2 | 12/2006 | Martin et al. | |
| 7,467,183 B2 * | 12/2008 | Arcuri et al. .................. | 709/203 |
| 7,631,260 B1 * | 12/2009 | Riggs et al. ................... | 715/716 |
| 7,669,123 B2 * | 2/2010 | Zuckerberg et al. .......... | 715/273 |
| 7,853,881 B1 * | 12/2010 | Aly Assal et al. ............. | 715/734 |
| 2003/0160818 A1 * | 8/2003 | Tschiegg et al. .............. | 345/743 |
| 2004/0006747 A1 * | 1/2004 | Tyler ............................. | 715/530 |
| 2004/0104947 A1 * | 6/2004 | Schmitt ......................... | 345/859 |

(Continued)

OTHER PUBLICATIONS

ClaimID. About ClaimID, via archive.org. Archived May 9, 2007. <http://web.archive.org/web/20070509062159/http://claimid.com/about>.*

(Continued)

*Primary Examiner* — Stephen Alvesteffer
(74) *Attorney, Agent, or Firm* — Andrew Sanders; Micky Minhas

(57) ABSTRACT

Various embodiments provide an individual with an ability to "sign up" or subscribe to an individual or entity so that they can automatically receive various content published by the individuals or entities. In at least some embodiments, sign up functionality can allow the individual to directly sign up to the person or entity. In yet other embodiments, sign up functionality is provided, at least in part, through the use of one or more services, such as a profile service. Using one or more services can obviate the need for an individual to remember sites, user names or log-in information while, at the same time provide the ability for the individual to synchronize content on their local computing device. In addition, using a profile service can provide an automatic, time-saving way to sign up to individuals or entities. In addition, in at least some embodiments, a user interface component is provided and serves to provide an aggregation view of information that is synchronized on the individual's local computing device.

20 Claims, 13 Drawing Sheets

(56) References Cited

U.S. PATENT DOCUMENTS

| | | |
|---|---|---|
| 2005/0273503 A1 | 12/2005 | Carr et al. |
| 2006/0059434 A1* | 3/2006 | Boss et al. .................... 715/780 |
| 2006/0095507 A1* | 5/2006 | Watson ........................ 709/203 |
| 2006/0173985 A1 | 8/2006 | Moore |
| 2006/0218491 A1* | 9/2006 | Grossman et al. ............ 715/517 |
| 2006/0242554 A1* | 10/2006 | Gerace et al. ............. 715/501.1 |
| 2006/0253489 A1 | 11/2006 | Kahn et al. |
| 2006/0264204 A1 | 11/2006 | Livingood |
| 2007/0011156 A1 | 1/2007 | Maron |
| 2007/0022174 A1 | 1/2007 | Issa |
| 2007/0300160 A1* | 12/2007 | Ferrel et al. .................. 715/744 |
| 2008/0077867 A1* | 3/2008 | Hake et al. ................... 715/730 |
| 2008/0244413 A1* | 10/2008 | Sampson et al. .............. 715/738 |
| 2008/0256443 A1* | 10/2008 | Li et al. ........................ 715/700 |

OTHER PUBLICATIONS

"Dare Obasanjo's WebLog", http://blogs.msdn.com/dareobasanjo/archive/2005/03/31/404096.aspx, Mar. 31, 2005.

"The Podcast RSS Buddy (sit)", Aug. 2006 http://software.techrepublic.com.com/download.aspx?docid=210547, Aug. 2006.

"Track Your Favorite RSS Feeds with Skype & Anothr", Date: Feb. 17, 2007, http://labnol.blogspot.com/2007/02/track-your-favorite-rss-feeds-with.html.

"Welcome to My.Epilepsy.Com!", http://my.epilepsy.com/?q=node/960146&from=30&comments_per_page=30, Mar. 6, 2007.

* cited by examiner

SIGNING UP TO A PERSON OR ENTITY

BACKGROUND

The recent proliferation of hardware (e.g., cameras, video cameras, cell phones, organizers, mp3 players and the like) to help people create interesting content, combined with new software or web sites (e.g., Windows Live™ Spaces, MySpace, Flickr, YouTube, Del.icio.us, Digg, and the like) that enable individuals to publish their content online, makes it very easy for an individual to publish a wide variety of different types of content in a wide variety of locations. For example, a person's friends or contacts can easily create and post content online. Yet, for the person whose friends post content in a wide variety of locations, locating and consuming the content can be a time intensive exercise which, many times, can leave some of their friends' posted content undiscovered. For the person who wishes to keep abreast of the publications of their friends, this situation is undesirable.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments provide an individual with an ability to "sign up" or subscribe to an individual or entity so that they can automatically receive various content published by the individual or entity. In at least some embodiments, sign up functionality can allow the individual to directly sign up to the person or entity. In yet other embodiments, sign up functionality is provided, at least in part, through the use of one or more services, such as a profile service. Using one or more services can obviate the need for an individual to remember sites, user names or log-in information while, at the same time provide an ability for the individual to synchronize content on their local computing device.

In addition, in at least some embodiments, a user interface component is provided and serves as an aggregation view of information that is synchronized on the individual's local computing device.

BRIEF DESCRIPTION OF THE DRAWINGS

The same numbers are used throughout the drawings to reference like features.

DETAILED DESCRIPTION

Overview

Various embodiments provide an individual with an ability to "sign up" or subscribe to an individual or entity so that they can automatically receive various content published by the individual or entity. In at least some embodiments, sign up functionality can allow the individual to directly sign up to the person or entity. In yet other embodiments, sign up functionality is provided, at least in part, through the use of one or more services, such as a profile service. Using one or more services can obviate the need for an individual to remember sites, user names or log-in information while, at the same time provide an ability for the individual to synchronize content on their local computing device. In addition, using one or more services can provide an automatic way to subscribe to many different individuals or entities that a person cares about, as well as save time while doing so.

In addition, in at least some embodiments, a user interface component is provided and serves to provide an aggregation view of information that is synchronized on the individual's local computing device.

In the discussion that follows, a section entitled "Example Computing Device" is provided and describes one computing device in which one or more embodiments can be employed. Following this, a section entitled "Subscribing to a Person or Entity" is provided and describes one or more embodiments in which an individual can subscribe to receive posted or published content from an individual or entity. After that, a section entitled "Notification and/or Consumption of a Subscription" describes how an individual can be notified and/or consume content from individuals or entities to which they have subscribed, in accordance with one or more embodiments. A section entitled "Subscribing to a Service" follows and describes how, in accordance with one or more embodiments, an individual can utilize one or more services to subscribe to individuals or entities. Last, a section entitled "Example System" provides a description of an example system that can be used to implement one or more embodiments.

Example Computing Device

Figure 1:
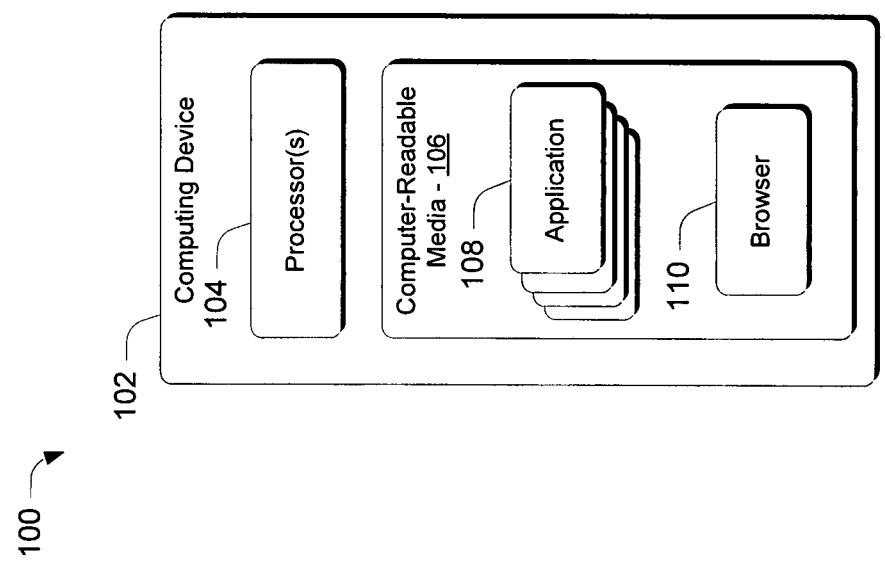
FIG. 1 illustrates a system in which various principles described herein can be employed in accordance with one or more embodiments.

FIG. 1 illustrates a computing system in accordance with one or more embodiments, generally at 100. System 100 includes a computing device 102 having one or more processors 104, one or more computer-readable media 106 and one or more applications 108 that reside on the computer-readable media and which are executable by the processor(s). The computer-readable media can include, by way of example and not limitation, all forms of volatile and non-volatile memory and/or storage media that are typically associated with a computing device. Such media can include ROM, RAM, flash memory, hard disk, removable media and the like. One specific example of a computing device is shown and described below in FIG. 13.

In addition, computing device 102 includes a software application in the form of a web browser 110. Any suitable web browser can be used examples of which are available from the assignee of this document and others. Further, in at least some embodiments, the computing device can include other types of software applications such as an instant messaging application, examples of which are available from the assignee of this document.

Computing device 102 and its various applications can be utilized to implement the embodiments described below. Specifically, as will become apparent below, the computing device and its applications can be utilized to enable an individual to subscribe to an individual and/or entity, as well as to subscribe to a service so that the individual can receive content that is posted or published by individuals or entities to whom they have subscribed. In the context of this document, the term "entity" as it pertains to subscriptions, is intended to means collections of individuals that can publish or post content. Entities can include, by way of example and not limitation, groups such as social groups or work groups, companies, corporations, associations and the like.

Computing device 102 can be any suitable computing device such as a desktop computer, portable computers, hand-held computers such as personal digital assistants (PDAs), cell phones and the like.

Subscribing to a Person or Entity

In one or more embodiments, an individual can subscribe to a person or entity so that the individual can automatically receive content that the person or entity publishes in any of a variety of locations on a network such as the Internet.

Figure 2:
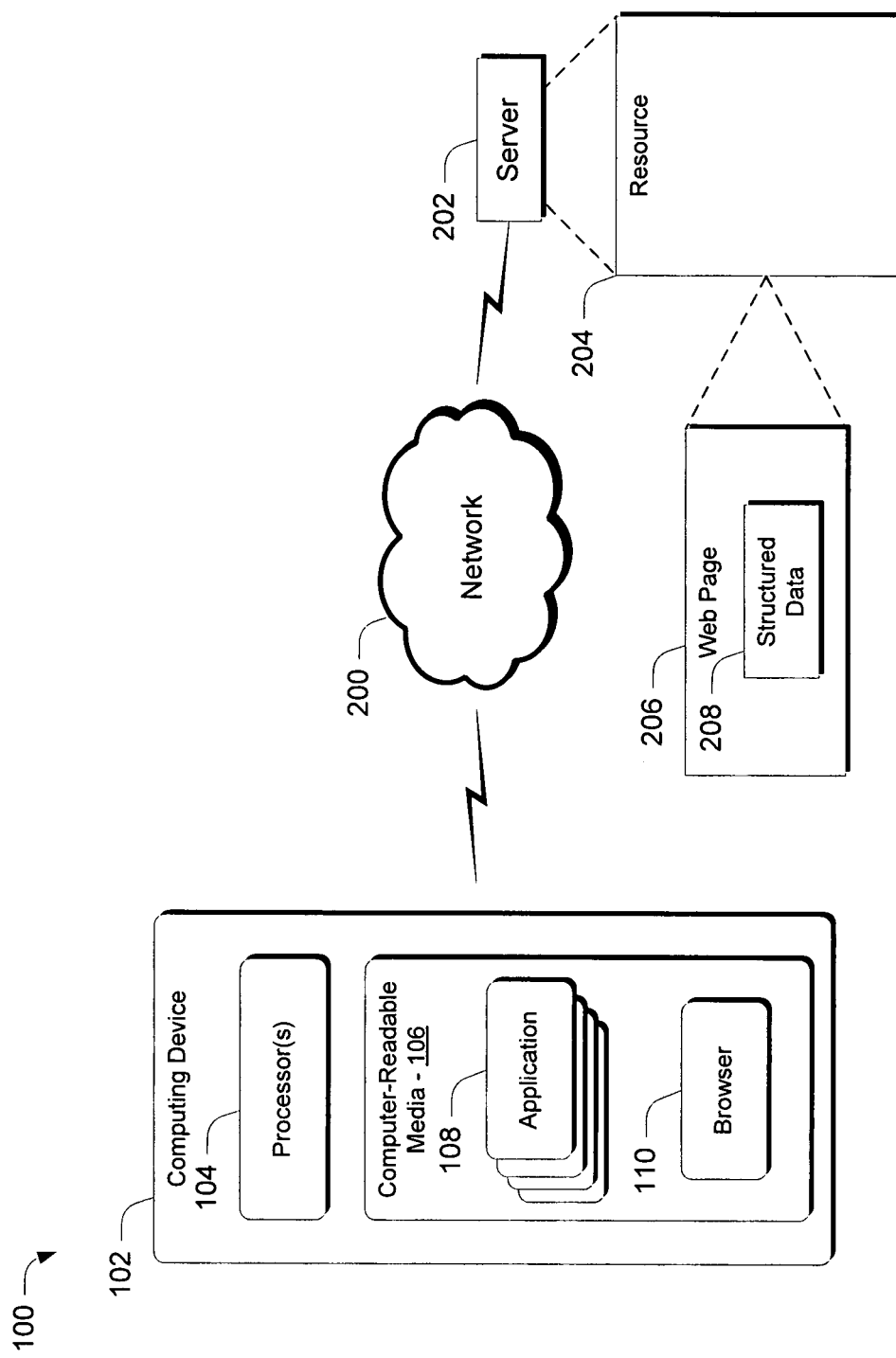
FIG. 2 illustrates the FIG. 1 system in accordance with one or more embodiments.

As an example, consider FIG. 2 which illustrates the FIG. 1 system in accordance with one or more embodiments. Here, system 100 is shown in conjunction with a network 200 such as the Internet. Network 200 enables a user of computing device 102 to access one or more servers 202 or other sources of published content so that the user can subscribe to a person or entity. In this example, server 202 provides access to one or more resources that include or otherwise make available content that has been published. Any suitable resource can serve as a source of published content. In this particular example, resource 204 is embodied as a web page 206 that includes structured data 208. The structured data can describe a person or an entity and can include properties that allow the person or the entity to provide links, such as URLs, to content or feeds that they have published. Once the structured data has been discovered, an individual wishing to subscribe to the person or entity can simply select to do so using a suitably configured user interface element an example of which is given below.

Structured data can be formatted in accordance with known or subsequently developed structured data standards, such as eXtensible Markup Language (XML) or HyperText Markup Language (HTML). For example, the structured data can be described in a web page's HTML in a manner that identifies the data's particular data type or, for example, in a vCard or Versitcard. Specifically, in one or more embodiments, HTML tags or other tags can be utilized to associate a data type with a particular instance of data. In one or more embodiments, structured data can be defined by using a <div> element, as will be appreciated by the skilled artisan. Accordingly, a <div> element can be used to define a person or entity class or type. The person or entity class or type includes one or more properties. The properties identify links associated with content published by a person who or entity that constitutes an instance of a person or entity class or type respectively. As an example, consider the structured data representation just below:

```
<div   class="person">
       <div   class="fn">Joe Doe</div>
       <a     class="url" href=http://
              example.com/feed.rss>http://example.com/feed.rss</a>
</div>
```

Here, the formal name (fn) and URL have been identified using specific class names and wrapped in a class called "person". The information contained in the "person" class can be used, as will become apparent, to subscribe an individual to the links or feeds referenced by the URL class. Thus, browsers can extract this information and use it accordingly.

In operation, when a user accesses a particular resource, such as by browsing to a particular web page, their browser parses the HTML associated with the web page. When the browser discovers structured data on the web page, such as by encountering the <div> element, the browser can render a user interface element, such as an icon, that notifies the user that there is structured data on the page. When the user selects the user interface element, a "subscribe" action can be exposed for the user to select in the event there are feeds or related content to which to subscribe. If the user selects the "subscribe" action, the browser can process the structured data and subscribe the user to content associated with the links or URLs referenced in the structured data. In this way, the user is subscribed to a person or entity associated with those links and the browser can associate all content from those feeds with the person or entity.

Figure 3:
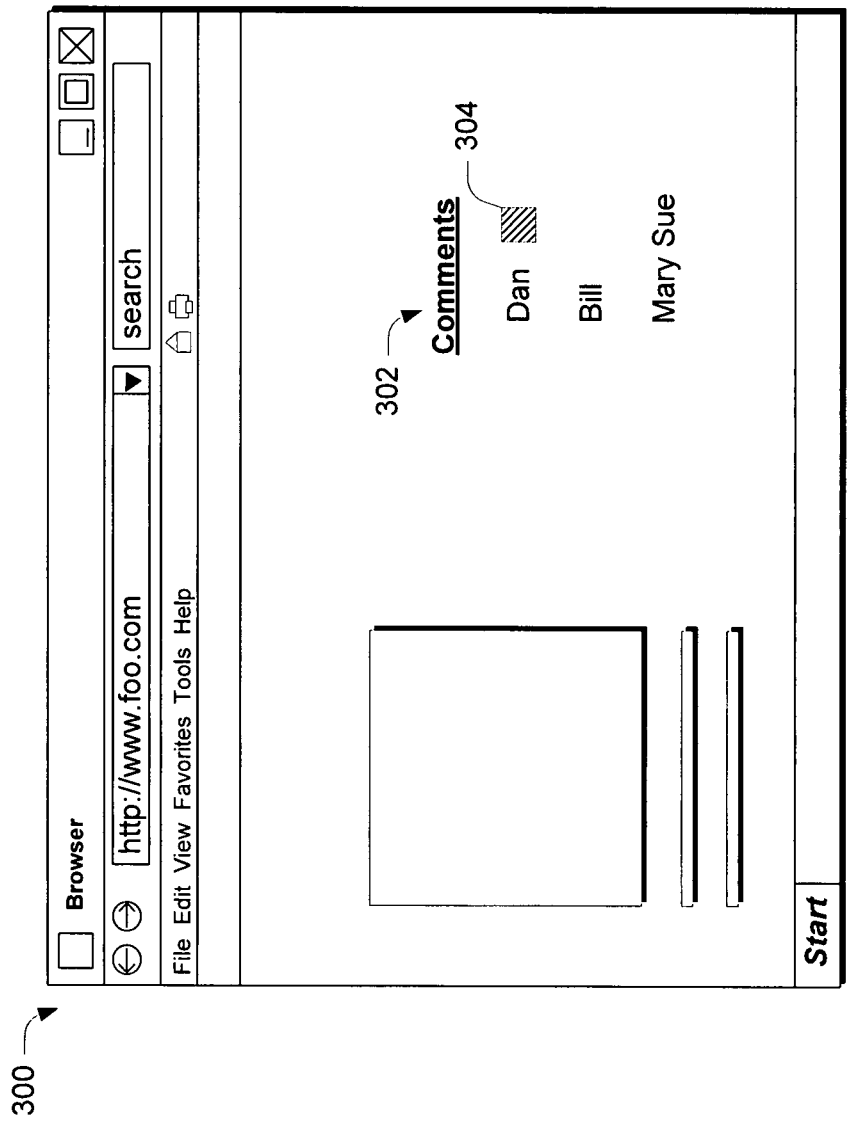
FIG. 3 illustrates a user interface in accordance with one or more embodiments.
Figure 4:
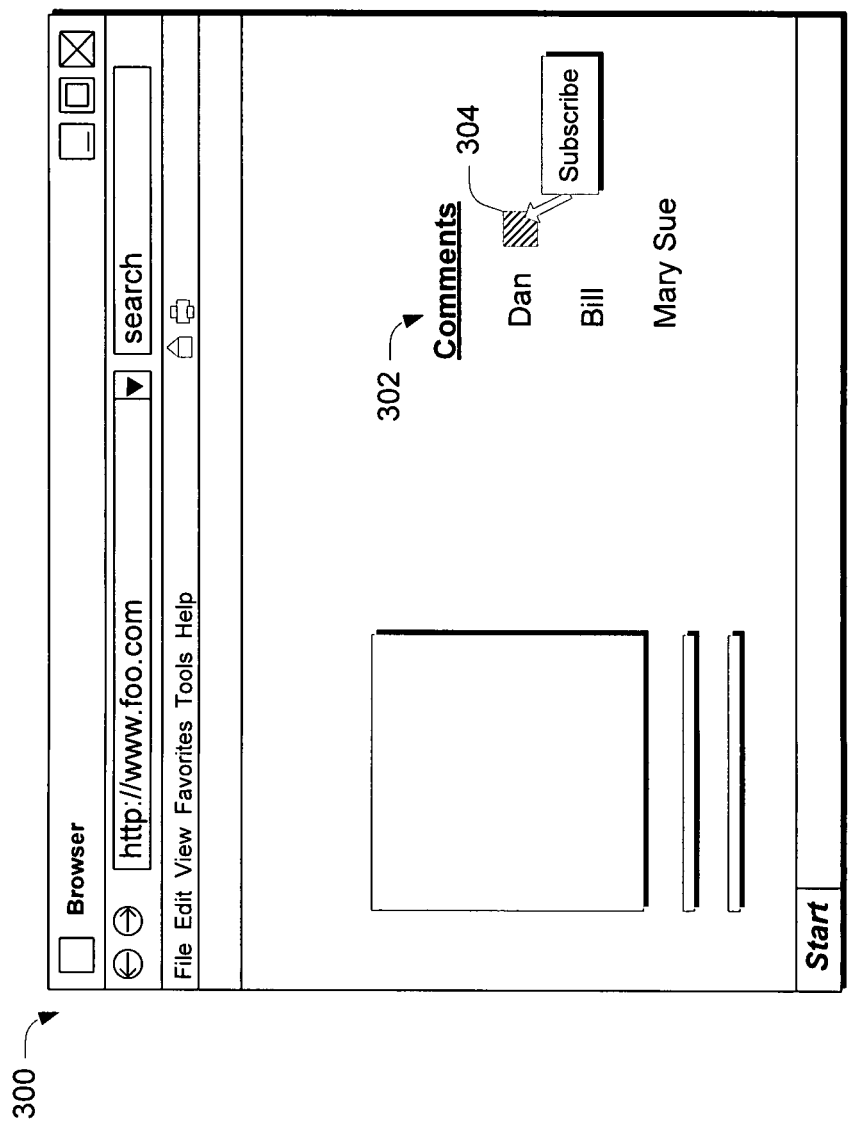
FIG. 4 illustrates a user interface in accordance with one or more embodiments.

As an example, consider the following in connection with FIG. 3. There, a browser window is shown generally at 300. Assume in this example that the user has browsed to a web page that enables individuals to post comments, such as comments 302, about particular topics. In this example, three individuals—Dan, Bill and Mary Sue—have posted comments about a particular topic. In addition, adjacent Dan's name appears a user interface element or icon 304. The presence of the user interface element or icon indicates that the web page contains structured data associated with Dan. Assume now that a user hovers their cursor over or adjacent icon 304, as in FIG. 4. By doing this, the user causes a "subscribe" action to appear. Now, by clicking on or otherwise selecting the "subscribe" action, the user can now subscribe to Dan. By subscribing to Dan, the user will now receive the content that Dan has chosen to share. For example, if Dan blogs on three different sites, posts pictures on another site, and has his own personal web site and the various site URLs or links are described in the structured data associated with the current web page, then the user can be automatically subscribed to Dan's referenced content. In addition, in some embodiments, the structured data could link to a feed which, in turn, is a set of feeds.

In the above-described example, the subscription process is implemented, at least in part, by a web browser. It is to be appreciated and understood that any suitable application can be used to subscribe a user to a person or entity and/or enable a user to access content that has been posted or published by others. For example, an instant messaging application can be used to help a user subscribe to or consume content that has been posted or published by a person or entity. Additionally, an email application can also be used to help a user subscribe to or consume content that has been posted or published by a person or an entity. For example, a person may have a list of their feeds included as part of their vCard. In this case, an email message may include the vCard as an attachment. If so, the email application can process the vCard and subsequently provide the recipient with an opportunity to subscribe to content or feeds referred to in the vCard.

Consider now what happens when the user is subscribed to a person or entity. In one or more embodiments, when the user is subscribed to a particular person or entity, the browser ascertains the link or links associated with the person or entity. But one example of how this can be done is provided above. The browser can then store the links in an appropriate store, such as a feed store, on the user's computing device and utilize a synchronization engine to receive updates associated with any of the links. Any suitable synchronization engine can be utilized. The synchronization engine can be one that is integrated with and comprises part of the application or browser, or one that is leveraged by the application or browser.

In one or more embodiments, the synchronization engine can regularly poll the sites associated with the stored links to ascertain whether any new content has been added. Alternately or additionally, the synchronization engine can register with the various sites to receive notifications of updates associated with the relevant links. If new content has been added, the user can be notified accordingly. Any suitable way of notifying the user can be used, examples of which are provided just below.

Having subscribed to a person or entity, consider now a number of different ways that a user can be notified of and/or consume content of a subscription.

Notification and/or Consumption of a Subscription

In one or more embodiments, when a user subscribes to a person or entity, entries can be automatically created in a folder that is accessible to their web browser. One example of such a folder is a browser's "Favorites" folder. A "Favorites" folder provides a location where an individual can organize and manage various links to their favorite web sites, RSS feeds and the like.

Figure 5:
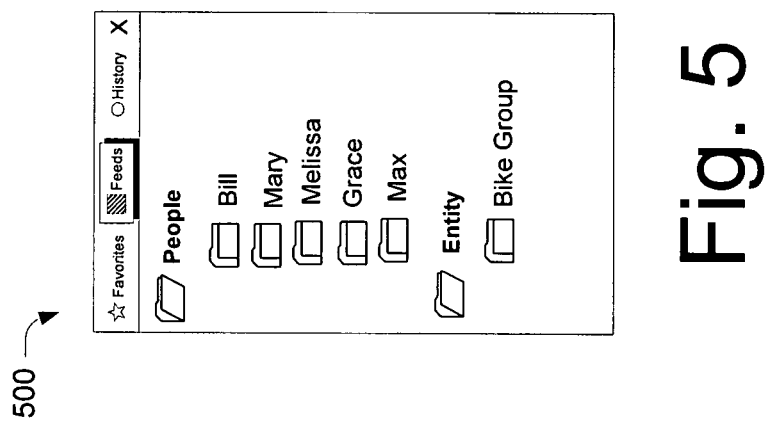
FIG. 5 illustrates a user interface in accordance with one or more embodiments.

The folder that is created can then contain a list of links or feeds to which the user is subscribed. As an example, consider FIG. 5. There, a portion of a browser user interface is shown generally at 500. Notice a "People" folder under which appears a number of sub-folders associated with names of people to whom the user has subscribed. A similar folder can be created for entities (e.g., groups, companies, associations) to which the user has subscribed. These individual sub-folders contain the links or feeds associated with each individual person or entity. In this way, the user can manage, view and consume their subscriptions in much the same way they manage, view and consume their favorite web sites. In one or more embodiments, folders can also be pre-populated with a set of people or entities. For example, if the user is a member of a particular profile service, the profile service can pre-populate a folder with their friends and entities, as well as associated feeds. In this case, in addition to the "People" and "Entity" folders in FIG. 5, a folder entitled "XYZ Profile Service" might be added, with the various sub-folders therebeneath being associated with the individual's friends and entities as understood by the profile service.

Alternately or additionally, the user can be notified automatically when new content has been added to a particular subscription. Notification can take place in any suitable way.

Figure 6:
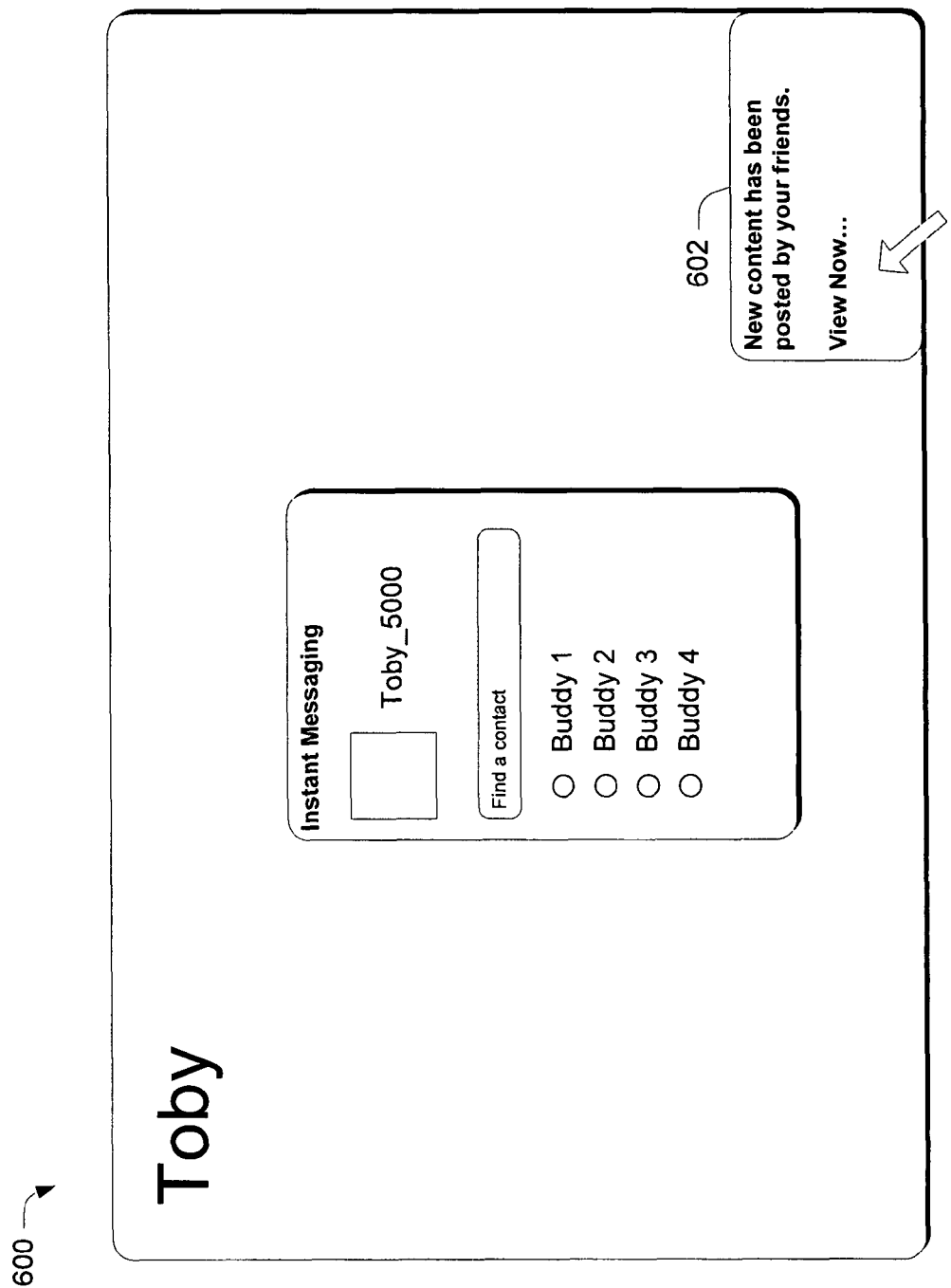
FIG. 6 illustrates a user interface in accordance with one or more embodiments.

For example, when a user signs into their browser or instant messaging client, an automatic notification can be displayed for the user. As an example, consider FIG. 6 which illustrates an example user interface for an instant messaging client generally at 600. Here, the user—Toby—has logged into his instant messaging client. A notification 602 is immediately presented to Toby and informs him that new content has been posted by at least one of his subscribed people or entities. By clicking on the notification, Toby can be automatically navigated to the new content that has been posted. In this example, when a user subscribes to an individual or entity, an instant messaging contact can be created or updated with the links that the individual or entity has chosen to share. In this case then, the link information can become part of the individual's or entity's presence information. This information can link to many different sources, and is not bound by any particular site or sets of sites.

Alternately or additionally, when new content has been posted by a person or entity, a gleam or some other type of visual indication can be associated with the appropriate subfolder in the user's "Favorites" folder. Now, when the user opens their "Favorites" folder they can, at a glance, ascertain whether any new content has been posted.

Figure 7:
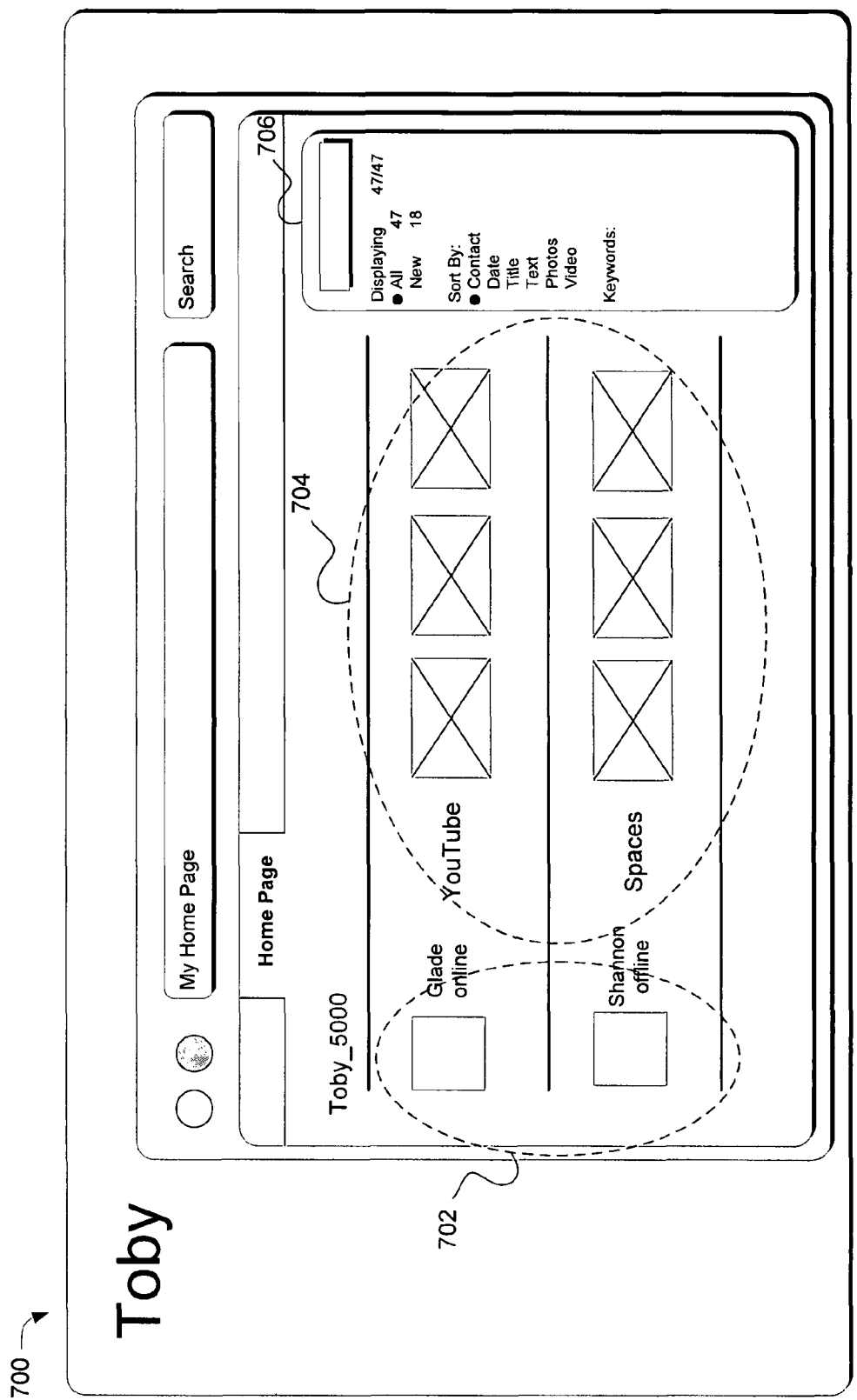
FIG. 7 illustrates a user interface in accordance with one or more embodiments.

Alternately or additionally, the web browser can provide a so-called aggregation view. As an example, consider FIG. 7. There, an aggregation view of Toby's friends is provided generally at 700. In one or more embodiments, the aggregation view can show content for people or entities to which Toby has subscribed and can give Toby the option to pivot the view in multiple different ways. For example, view 700 illustrates a view that has been pivoted by person. Specifically, view 700 includes a region 702 that identifies a particular person or entity, a region 704 that provides an indication of where and what content has been posted by the particular person or entity, and a region 706 that enables the user to pivot the view in any number of ways. Notice in region 706 that the "All" option has been selected. This effectively displays all of the content for an individual that Toby might select. The "New" option would display only the new content that has been added since the content was last consumed by Toby.

Notice also that a "Sort By" field is provided and allows Toby to pivot or filter his view in any number of ways, e.g. by contact, date, title, text, photos, video, type and the like. For example, using filter options, the number of items that appears in the view can be reduced. By using pivoting options, the information can be reorganized in a certain way.

Figure 8:
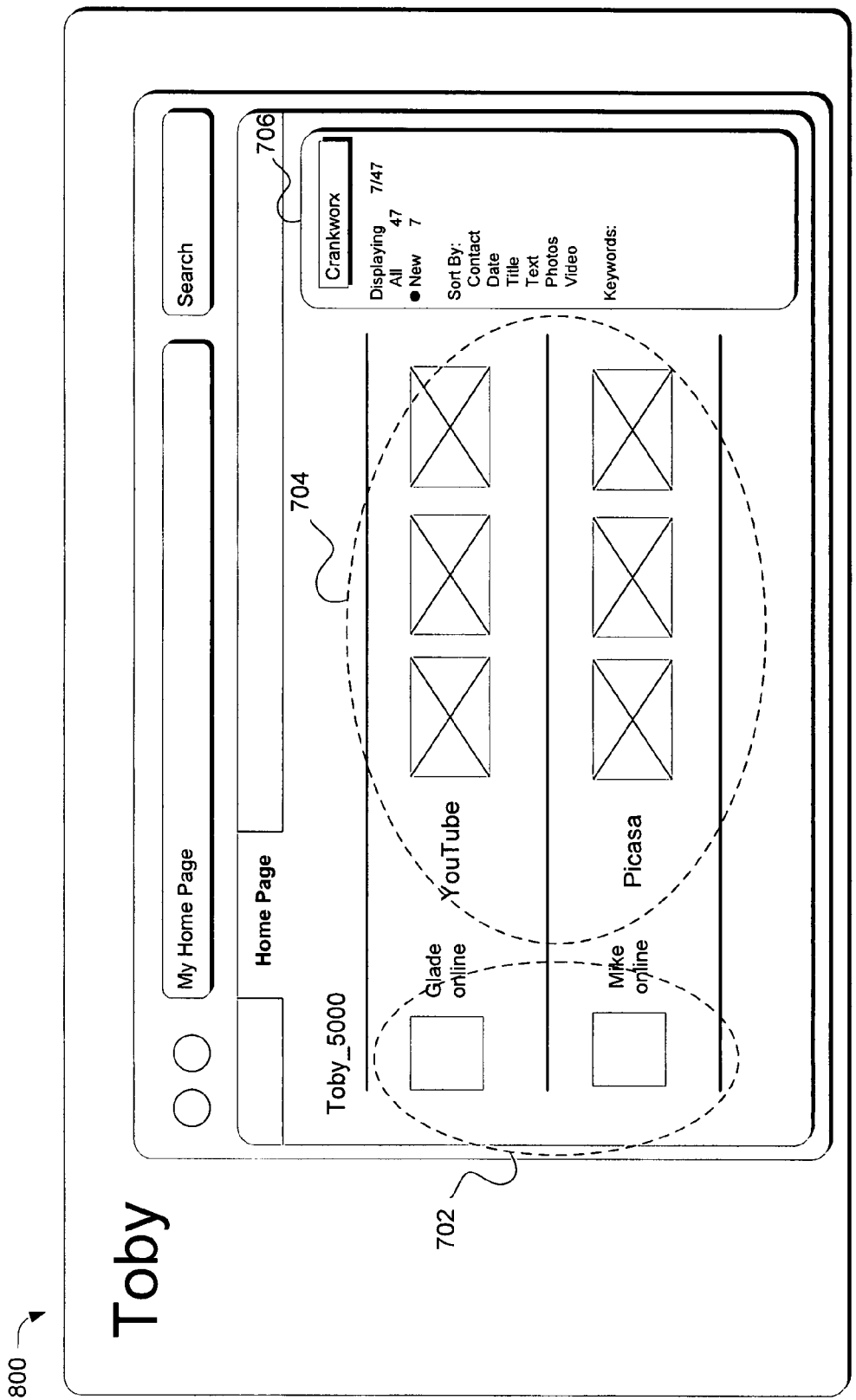
FIG. 8 illustrates a user interface in accordance with one or more embodiments.
Figure 9:
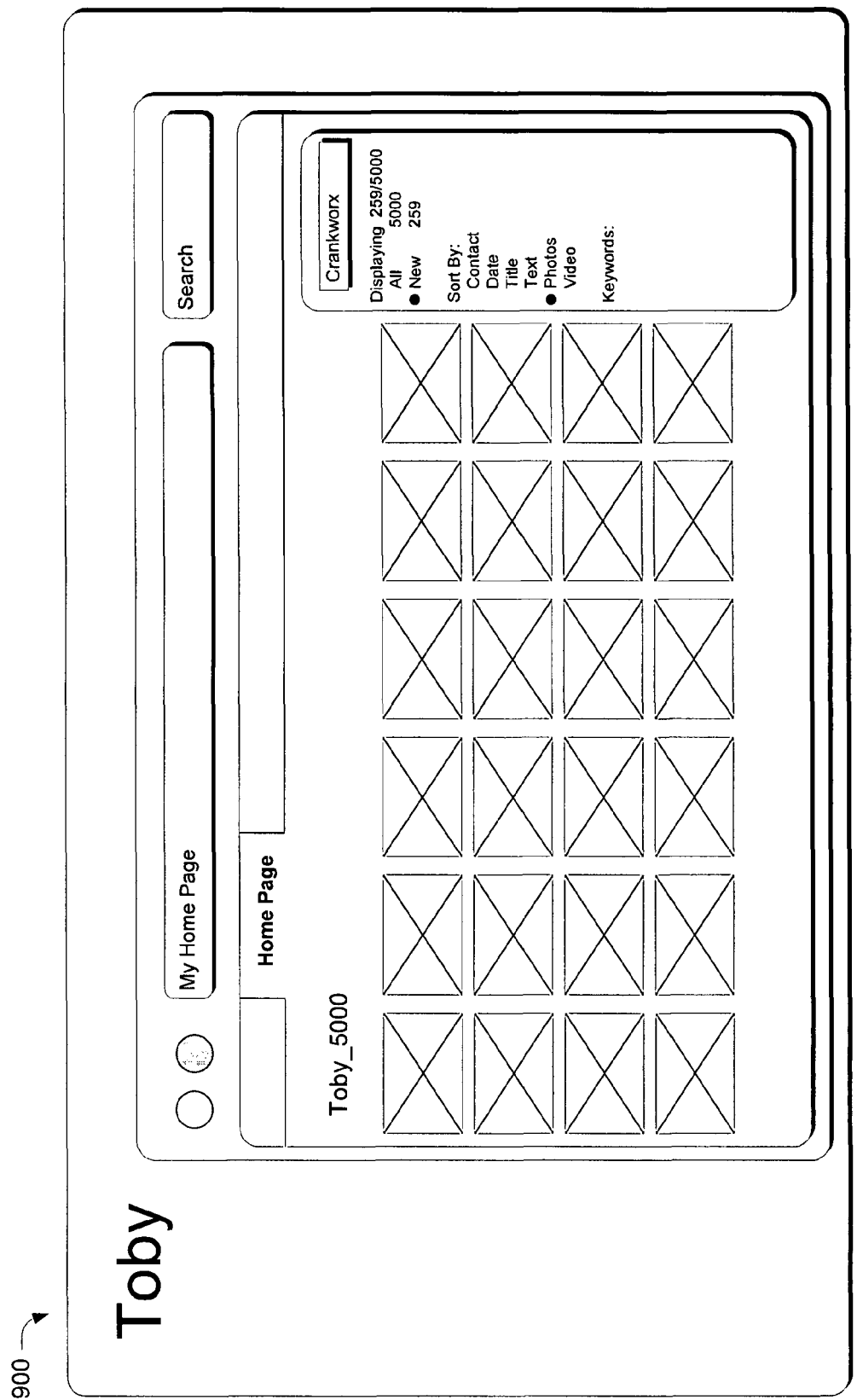
FIG. 9 illustrates a user interface in accordance with one or more embodiments.

FIG. 8 illustrates a view 800 that has been filtered to show any item that has "Crankworx" related content. For the displayed individuals, all new content associated with Crankworx is shown. FIG. 9 illustrates a view 900 that has been filtered first by the term "Crankworx", and then by photo.

Figure 10:
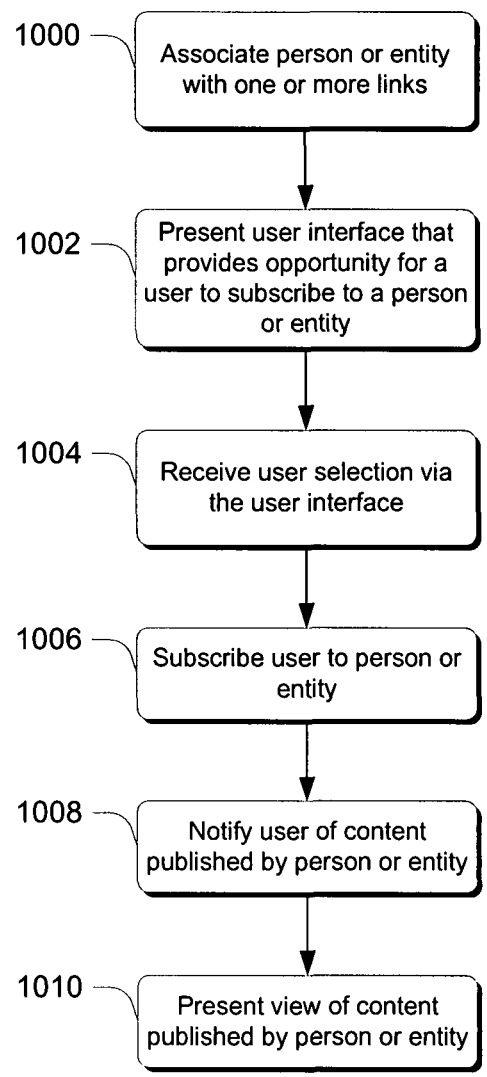
FIG. 10 is a flow diagram that describes steps in a method in accordance with one or more embodiments.

FIG. 10 is a flow diagram that describes steps in a method in accordance with one or more embodiments. The method can be implemented in connection with any suitable hardware, software, firmware or combination thereof. In at least some embodiments, at least some steps of the method can be implemented by a suitably configured software application, such as a web browser or instant messaging application.

Step 1000 associates a person or entity with one or more links. This step can be accomplished in any suitable way. For example, in at least some embodiments, a person or entity can have a profile that includes a list of one or more links that a person or entity has opted to share. These links can be associated with any type of content that the person or entity posts or publishes. In at least some embodiments, this profile can be included in structured data that is associated with a resource that others can access and consume. Alternately or additionally, a profile service can provide a list of profiles including references to related feeds.

Step 1002 presents a user interface that provides an opportunity for a user to subscribe to a person or entity. Examples of how this can be done are provided above. Step 1004 receives a user selection via the user interface indicating that a user wishes to subscribe to a particular person or entity. Step 1006 subscribes the user to the person or entity. Examples of how this can be done are provided above. Step 1008 notifies the user of content published by a subscribed person or entity and step 1010 presents a view of content that has been published by a subscribed person or entity.

Having discussed the notion of signing up to a person or entity and how subscriptions can be viewed and consumed, consider now how a user can subscribe to a service to receive content that has been published or posted by various individuals or entities.

Subscribing to a Service

In at least some embodiments, sign up functionality is provided, at least in part, through the use of one or more services, such as a profile service. Using one or more services can obviate the need for an individual to remember sites, user names or log-in information while, at the same time provide the ability for the individual to synchronize content on their local computing device. Using a service can also provide a great time savings because it is generally automatic in its function, as will become apparent below.

Figure 11:
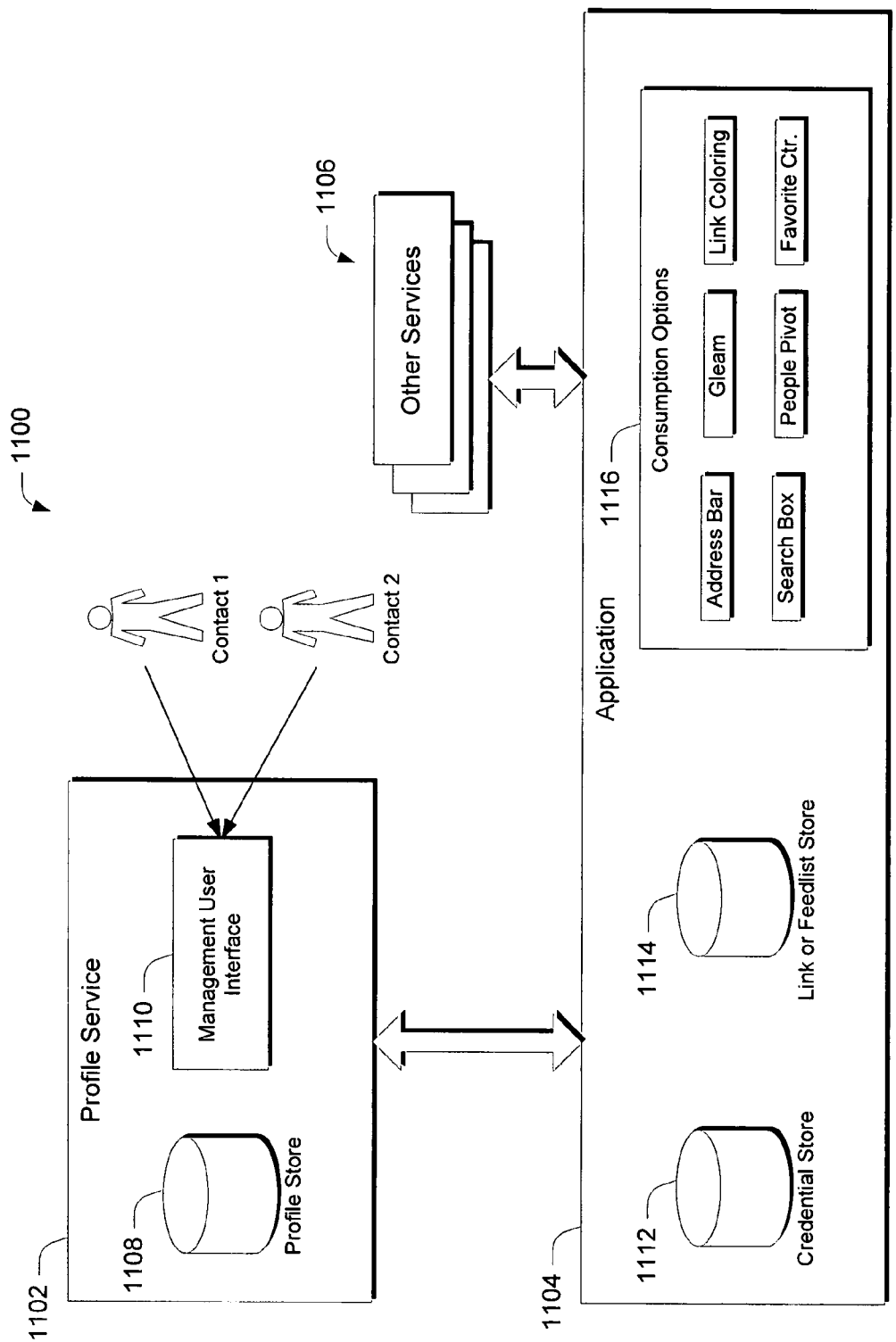
FIG. 11 illustrates an example system in accordance with one or more embodiments.

FIG. 11 illustrates an example system in accordance with one or more embodiments, generally at 1100. There, system 1100 includes a profile service 1102, an application such as a web browser 1104 and, optionally, one or more other services 1106.

In this example, profile service 1102 includes a profile store 1108 that includes profiles for a number of individuals or entities. An individual's profile includes an identifier that identifies the individual, as well as a list of links or feeds that the individual has opted to share. In addition to storing this information, the profile service also stores, for individuals or entities, a list of their contacts. So, for example, Bill's profile includes a list of links or feeds that Bill wishes to share, as well as a list of Bill's contacts along with their contact information, such as email address or instant messaging ID.

In one or more embodiments, the profile service 1102 can collect additional information, via a management user interface 1110, from various users to help the profile service build its list of users and links. For example, in at least some embodiments, the profile service can query individual users to enter their IDs and, optionally, passwords for various web sites to which they post, e.g. Flickr, YouTube, etc. The profile service can then log into these web sites and establish links for the various individuals to the content that they wish to share. Once an individual's profile is built, his or her content is ready to be synchronized on the computing devices of their friends.

In one or more embodiments, application 1104 includes or otherwise has access to a credential store 1112 that stores, for each profile service, the user name and password of an individual who uses the application. The user name and password enable the user and the application to log onto one or more services, such as profile service 1102. To subscribe to or synchronize the posted or published content of a user's contacts, application 1104 generates a request that includes the user's user name and password and sends the request to the profile service 1102, or any other relevant profile service. The profile service receives the request and, by virtue of knowing the user's contact list, can return to the application names of their contacts along with a list of links or feeds that can be used to synchronize content on the user's computing device. This information is received by the application and placed in a store 1114, such as a feedlist store, that maintains an association between individuals and their shared links or feeds. Once application 1104 has this information, it can leverage the information to synchronize content on the user's computing device with content that their contacts have published or posted. Examples of how this can be done are provided above and include, by way of example and not limitation, utilizing a synchronization engine that can poll or register for notifications associated with new postings or publications. Specifically, a synchronization engine can contact one or more services 1106 associated with the links of a particular person and synchronize content, such as a feed or other content, from a particular site. The application can then receive back, from the service(s) content that can be placed in an appropriate store and exposed to the user, as described above. The information that is contained in a user's profile or received back from the profile service(s) can be used in a variety of ways and by a variety of application features, such as by the address bar, search box, by link coloring, in an aggregation view, as described above.

Having described how an application can subscribe to or synchronize content, consider now various ways in which the application can utilize this information. One of the ways that an application can utilize the information that it receives via the subscription or synchronization process is to present various consumption options 1116 for the user. For example, an individual can search for content published by their contacts by using any suitable means such as an address bar search or a search box.

Alternately or additionally, the application can use visual notifications, such as a gleam, to identify a site that contains newly posted information when a user browses to that site. This newly posted information may or may not have already been synchronized on the user's local computing device. For example, when a user browses to a particular web site, if there is new content on their local device that the user has not yet viewed, the browser can provide a visual notification to the user so that the user can access and view this new content. One way to implement this functionality is as follows. When the user browses to a web site, their browser queries the local store for all of the content related to that site that was sent to the local computing device. Once the browser has ascertained the content that is locally stored, it can check to see if the user has consumed the content. If the user has not yet seen or otherwise consumed the content, a visual notification such as a gleam can be provided. The gleam can be provided in any suitable location, e.g. in the address bar, next to the web site's link and the like, to notify the user that there is something new on their computing device associated with that particular domain. By clicking on the gleam, the user can be navigated to the new content.

Alternately or additionally, a user can consume content on their local machine using an aggregation view that can permit, for example, a people pivot as described above.

Alternately or additionally, one of the consumption options can be to provide link coloring. Specifically, when a user navigates to a particular site, the link for that site can be colored in a manner to indicate that one or more of their friends has visited the site, e.g. by representing the link in red or orange rather than in blue.

Alternately or additionally, an application's "favorites experience", or where a user manages their favorite web sites, subscriptions and the like, can be utilized to expose the user to content associated with their subscriptions. Examples of how this can be done are provided above.

Figure 12:
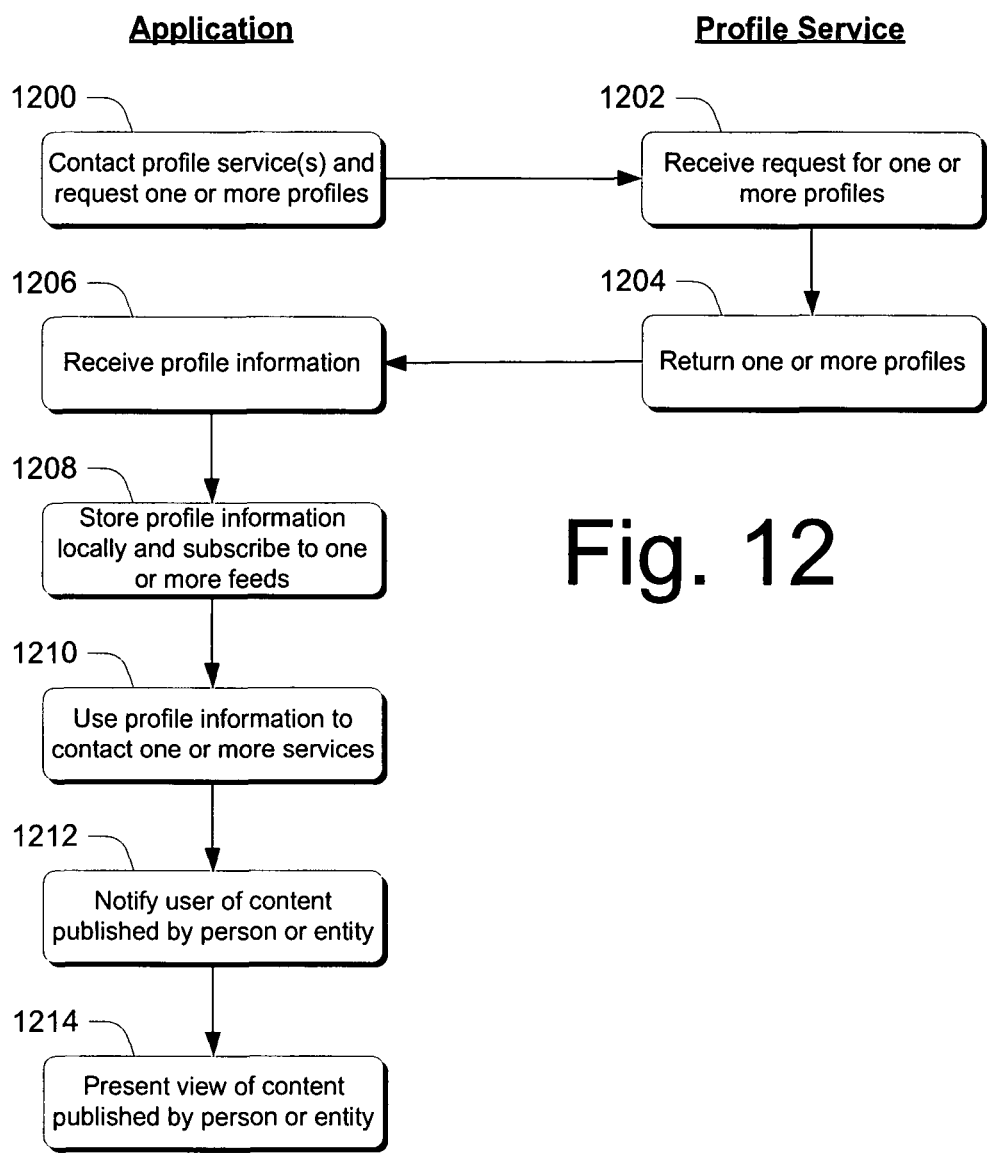
FIG. 12 is a flow diagram that describes steps in a method in accordance with one or more embodiments.

FIG. 12 is a flow diagram that describes steps in a method in accordance with one or more embodiments. The method can be implemented in connection with any suitable hardware, software, firmware or combination thereof. In at least some embodiments, at least some steps of the method can be implemented by or on behalf of a suitably configured software application, such as a web browser or instant messaging application. Other steps of the method can be implemented by a suitably configured profile service. This is emphasized in the figured by having some of the steps appear under the heading "Application" and other of the steps appear under the heading "Profile Service".

Step 1200 contacts a profile service(s) and requests one or more profiles related to a particular user. The profiles can be those that are associated with a user's contacts, such as those contacts that appear in their email contacts and/or instant messaging contacts or buddy lists. The profiles include profile information that includes links or feeds associated with the individual contacts, buddies or entities. Examples of how this can be done are provided above. Step 1202 receives the request for the profile(s) and step 1204 returns one or more profiles to the application. Examples of how this can be done are provided above.

Step 1206 receives profile information and step 1208 stores the profile information locally and subscribes to one or more feeds referenced in the profile information. Examples of how this can be done are provided above. Step 1210 uses the profile information to contact one or more services. The services that are contacted can be those services that host sites where a user's contacts have posted or published content. Step 1212 notifies the user of content published by a subscribed person or entity and step 1214 presents a view of content that has been published by a subscribed person or entity. Examples of how this can be done are provided above.

Having now described how an individual can subscribe to an individual, entity and a service, consider now an example system or computing device that can be used to implement the above-described functionality.

Example System

Figure 13:
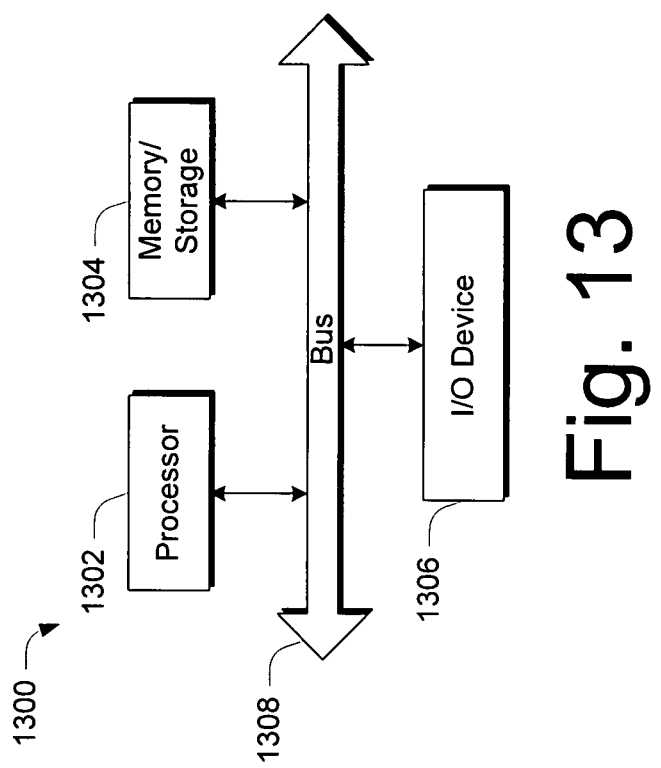
FIG. 13 illustrates an example computing device that can implement various embodiments.

FIG. 13 illustrates an example computing device 1300 that can implement the various embodiments described above. Computing device 1300 can be, for example, computing device 102 of FIG. 1 or any other suitable computing device.

Computing device 1300 includes one or more processors or processing units 1302, one or more memory and/or storage components 1304, one or more input/output (I/O) devices 1306, and a bus 1308 that allows the various components and devices to communicate with one another. Bus 1308 represents one or more of any of several types of bus structures, including a memory bus or memory controller, a peripheral bus, an accelerated graphics port, and a processor or local bus using any of a variety of bus architectures. Bus 1308 can include wired and/or wireless buses.

Memory/storage component 1304 represents one or more computer storage media. Component 1304 can include volatile media (such as random access memory (RAM)) and/or nonvolatile media (such as read only memory (ROM), Flash memory, optical disks, magnetic disks, and so forth). Component 1304 can include fixed media (e.g., RAM, ROM, a fixed hard drive, etc.) as well as removable media (e.g., a Flash memory drive, a removable hard drive, an optical disk, and so forth).

One or more input/output devices 1306 allow a user to enter commands and information to computing device 1300, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Conclusion

Various embodiments provide an individual with an ability to "sign up" or subscribe to an individual or entity so that they can automatically receive various content published by the individuals or entities. In at least some embodiments, sign up functionality can allow the individual to directly sign up to the person or entity. In yet other embodiments, sign up functionality is provided, at least in part, through the use of one or more services, such as a profile service. Using one or more services can obviate the need for an individual to remember sites, user names or log-in information while, at the same time provide the ability for the individual to synchronize content on their local computing device. In addition, using one or more services can provide a time savings as well, as should be apparent.

In addition, in at least some embodiments, a user interface component is provided and serves as an aggregation view of information that is synchronized on the individual's local computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A system comprising:
one or more computer-readable storage media devices;
a web browser embodied on the one or more computer-readable storage media devices, the web browser being configured to:
enable a user to sign up to a person or entity by subscribing to receive, from different sites, content that the person or entity posts or publishes by at least providing a web page comprising structured data that includes a profile associated with the person or entity, the profile including links associated with the content that the person or entity posts or publishes;
enable the user to utilize a profile service to sign up to one or more people or one or more entities by subscribing to receive, from different sites, content that the one or more people or one or more entities post or publish by at least:
contacting the profile service; and
requesting one or more profiles associated with the one or more people or one or more entities, the one or more profiles including profile information having links or feeds associated with the content that the one or more people or one or more entities post or publish; and
registering the user with each of the different sites to receive notifications associated with new postings or publications by the one or more people or one or more entities;
present various consumption options for the user, at least one of the consumption options including link coloring of a particular link to indicate that one or more friends of the user has visited a site corresponding to the particular link; and
enable multiple different views of content to which the user has been subscribed, at least one view comprising different segmented regions that include:
a first region for identifying a particular person or entity to which the user is subscribed;
a second region for providing an indication of where and what content has been posted or published by the particular person or entity to which the user is subscribed; and
a third region configured to enable the user to pivot the at least one view based on user-selected criteria.

2. The system of claim 1, wherein the web browser is configured to:
use the profile information to contact one or more services that are utilized by the one or more people or the one or more entities to post or publish; and
receive content associated with the links or feeds.

3. The system of claim 1, wherein the web browser is configured to notify the user of new content published by a subscribed person or entity.

4. The system of claim 1, wherein the web browser is configured to provide browser-accessible folders to allow the user to manage, view and consume their subscriptions.

5. The system of claim 4, wherein the web browser is configured to provide a notification of new content by providing a visual indication associated with a browser-accessible folder.

6. The system of claim 1, wherein the web browser is configured to use information associated with subscribed people or entities in different ways.

7. The system of claim 1, wherein the first region is displayed proximate to the second region on the user interface in the at least one view.

8. The system of claim 1, wherein the user interface is configured to indicate whether the particular person or entity to which the user is subscribed is currently online.

9. The system of claim 1, wherein the web browser is further configured to navigate to one or more of the new postings or publications when a received notification is selected.

10. A method comprising:
enabling a user to sign up, via web browser, to a person or entity by subscribing to receive, from different sites, content that the person or entity posts or publishes by at least providing a web page comprising structured data that includes a profile associated with the person or entity, the profile including links associated with the content that the person or entity posts or publishes;
enabling the user to utilize a profile service, via the web browser, to sign up to one or more people or one or more entities by subscribing to receive, from different sites, content that the one or more people or one or more entities post or publish by at least:
contacting the profile service; and
requesting one or more profiles associated with the one or more people or one or more entities, the one or more profiles including profile information having links or feeds associated with the content that the one or more people or one or more entities post or publish; and
registering the user with each of the different sites to receive notifications associated with new postings or publications by the one or more people or one or more entities;
presenting various consumption options for the user, at least one of the consumption options including link coloring of a particular link to indicate that one or more friends of the user has visited a site corresponding to the particular link; and
providing multiple different views of content to which the user has been subscribed, at least one view comprising different segmented regions that include:
a first region for identifying a particular person or entity to which the user is subscribed;
a second region for providing an indication of where and what content has been posted or published by the particular person or entity to which the user is subscribed; and
a third region configured to enable the user to pivot the at least one view based on user-selected criteria.

11. The method of claim 10, further comprising:
using the profile information to contact one or more services that are utilized by the one or more people or the one or more entities to post or publish; and
receiving content associated with the links or feeds.

12. The method of claim 10, further comprising notifying the user of new content published by a subscribed person or entity.

13. The method of claim 10, further comprising providing browser-accessible folders to allow the user to manage, view, and consume their subscriptions.

14. The method of claim 13, further comprising providing a notification of new content by providing a visual indication associated with a browser-accessible folder.

15. The method of claim 10, wherein the first region is displayed proximate to the second region on the user interface in the at least one view.

16. The method of claim 10, further comprising indicating whether the particular person or entity to which the user is subscribed is currently online.

17. The method of claim 10, further comprising navigating to one or more of the new postings or publications when a received notification is selected.

18. One or more computer-readable storage media devices having computer-readable instructions thereon which, when executed, implement a method comprising:
enabling a user to sign up, via web browser, to a person or entity by subscribing to receive, from different sites, content that the person or entity posts or publishes by at least providing a web page comprising structured data that includes a profile associated with the person or entity, the profile including links associated with the content that the person or entity posts or publishes;

enabling the user to utilize a profile service, via the web browser, to sign up to one or more people or one or more entities by subscribing to receive, from different sites, content that the one or more people or one or more entities post or publish by at least:

contacting the profile service; and requesting one or more profiles associated with the one or more people or one or more entities, the one or more profiles including profile information having links or feeds associated with the content that the one or more people or one or more entities post or publish; and registering the user with each of the different sites to receive notifications associated with new postings or publications by the one or more people or one or more entities;

presenting various consumption options for the user, at least one of the consumption options including link coloring of a particular link to indicate that one or more friends of the user has visited a site corresponding to the particular link; and providing multiple different views of content to which the user has been subscribed, at least one view comprising different segmented regions that include:

a first region for identifying a particular person or entity to which the user is subscribed;

a second region for providing an indication of where and what content has been posted or published by the particular person or entity to which the user is subscribed; and a third region configured to enable the user to pivot the at least one view based on user-selected criteria.

19. The one or more computer-readable storage media devices of claim 18, further comprising providing a notification of new content by providing a visual indication associated with the browser-accessible folder.

20. The one or more computer-readable storage media devices of claim 18, further comprising providing an aggregation view that can show content for multiple people or multiple entities to which the user has subscribed.

\* \* \* \* \*